May 8, 1923.
R. H. STULL
1,454,696
OILING DEVICE
Filed Oct. 26, 1921
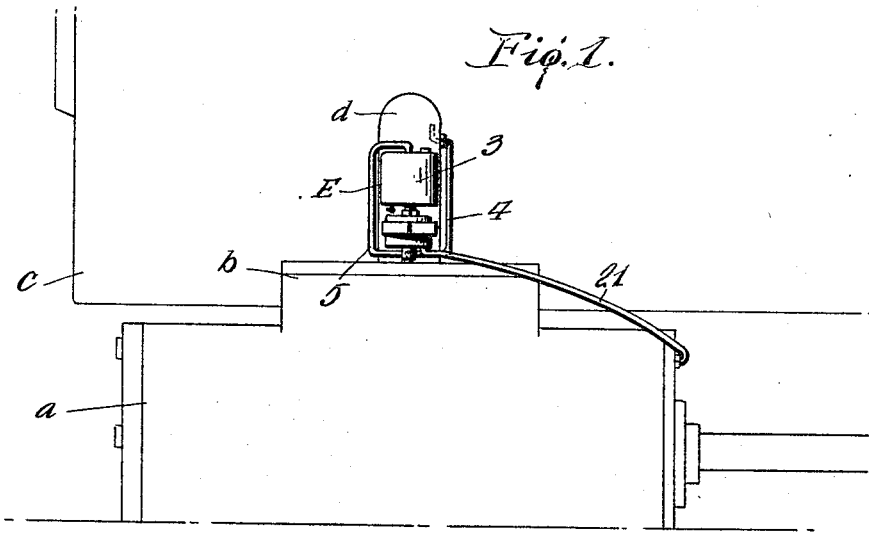
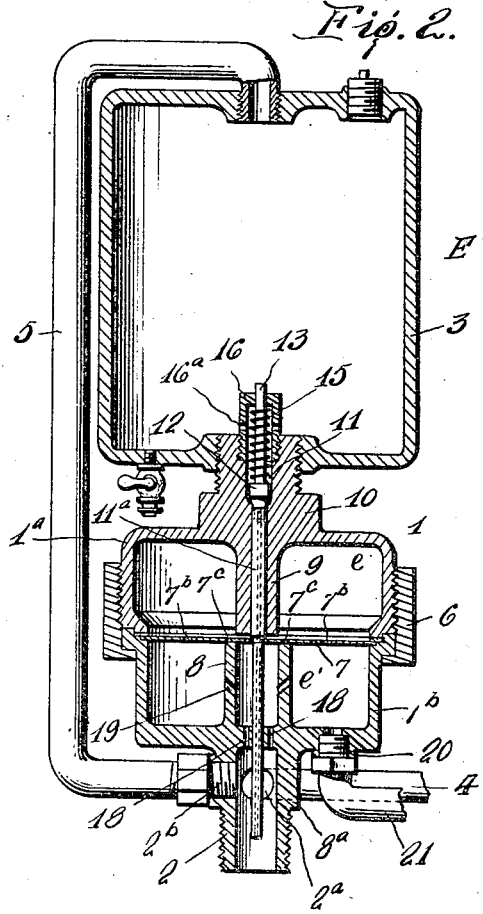
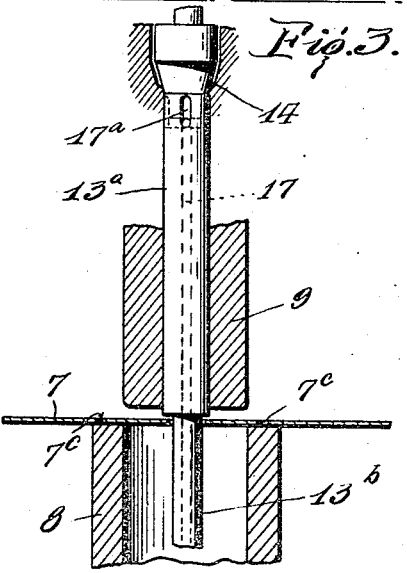
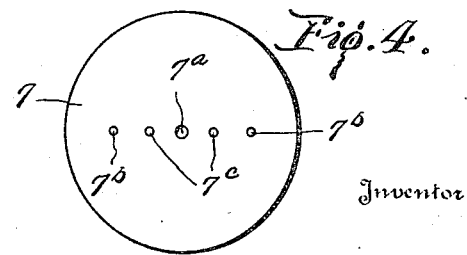
Inventor
Roy H. Stull
By C. W. Clement
Attorney Patented May 8, 1923.

1,454,696

UNITED STATES PATENT OFFICE.

ROY H. STULL, OF SUNBURY, PENNSYLVANIA, ASSIGNOR OF THREE-TENTHS TO NORMAN SUHRIE, OF SUNBURY, PENNSYLVANIA.

OILING DEVICE.

Application filed October 26, 1921. Serial No. 510,423.

*To all whom it may concern:*

Be it known that I, ROY H. STULL, a citizen of the United States, residing at Sunbury, in the county of Northumberland and State of Pennsylvania, have invented certain new and useful Improvements in Oiling Devices, of which the following is a specification.

This invention relates to oiling devices particularly adapted for oiling the valves and cylinders of steam engines, air compressors, or other machines wherein the functioning of the machine causes an intermittent fluid pressure, which is used to cause intermittent action of the oiler. While the oiler is designed particularly for oiling the internal parts of such machines, it may be used for oiling parts of these or other machines which are not subject to internal pressure, by connecting the device with a source of fluid pressure wherein the pressure is intermittently varied.

In carrying out the invention, I provide an oil reservoir having an outlet and a normally closed valve controlling said outlet, with means for maintaining equal pressures within the reservoir and at the outlet so that when the valve is open, the oil may pass by gravity from the reservoir through the outlet. In association with these parts I provide a casing which is divided into two compartments, by a movable wall, which latter, when moved from its normal position, opens the valve which controls the oil outlet. These chambers are connected by one or more restricted passageways through which air, steam, or other fluid may pass to equalize the pressures on opposite sides of the movable wall. One of these chambers is connected to a source of variable fluid pressure, such as the end of a steam engine cylinder, and the fluctuating pressure transmitted to this latter chamber causes the actuation of the valve. Thus, an increase in pressure in said latter chamber causes the movable wall to open the valve, but this increased pressure on one side of the movable wall is immediately equalized on the opposite side of said wall by leakage through the restricted orifice aforesaid and the wall returns to normal position, allowing the valve which controls the flow of oil to close. Thus, each time steam is admitted to the end of the engine cylinder to which the casing of the oiler is connected, the movable wall or part in the casing will be actuated to open the valve controlling the flow of oil, and immediately thereafter this movable part will return to its normal position and the valve will be permitted to close. The invention also involves various features of construction adapted to cause the quick and positive action of the oil controlling valve, the details of which will be pointed out in the following specification.

In the accompanying drawing,

Fig. 1 is a side elevation in outline of a locomotive cylinder and steam chest and a part of the boiler, showing my invention applied thereto;

Fig. 2 is a central vertical section through the oiler;

Fig. 3 is a detail view on an enlarged scale, showing the valve which controls the flow of oil from the reservoir and some of the associated parts; and, Fig. 4 is a plan view of the diaphragm partition which actuates the valve.

Referring to the drawing, $a$ indicates one of the cylinders of a locomotive, $b$ the steam chest, $c$ the boiler, and $d$ represents the steam pipe for admitting steam from the boiler to the steam chest. Upon the top of the steam chest is shown the oiler of my invention, represented as a whole by the letter E. This oiler comprises a casing 1, having at its lower end a threaded fitting 2, which screws into a threaded opening in the top of the steam chest, and upon the top of the casing is mounted an oil reservoir 3. The fitting 2 is provided with a threaded opening $2^a$, adapted to receive one end of a pipe 4 which connects the interior of the fitting with the steam pipe $d$. It is also provided with a threaded opening $2^b$ which receives one end of a pipe 5, leading to an opening in the top of the oil reservoir, as shown in Fig. 2. With this arrangement, assuming the fitting 2 to be threaded into steam chest, when live steam is admitted to the steam chest, the pressure in the reservoir above the oil and in the interior of the fitting will be equalized and the pressure will be substantially the same as that in the steam pipe and steam chest.

The casing 1 comprises two cylindrical parts 1ª and 1ᵇ which are clamped together steam-tight by a threaded clamping ring 6, and between the parts is secured a diaphragm 7 which separates the casing into two compartments e and e'. The part 1ᵇ of the casing has an upward tubular part 8 in its central portion, the top of which reaches to the underside of the diaphragm and forms a stop against which the diaphragm normally rests. The part 1ª of the casing has a central downwardly projecting hub 9, the lower end of which is a short distance from the upper side of the diaphragm and forms a stop to limit the upward movement of the diaphragm. The part 1ª also has an upward extension 10, which is threaded into the bottom of the reservoir and forms a support for the latter. The part 10 has a central bore 11, which extends downwardly from its upper end and connects with a smaller bore 11ª, which latter extends centrally through the part 9, and in the center of the diaphragm and the center of the base of the part 1ᵇ are perforations 7ª and 8ª, respectively, of smaller diameter than the bore in the part 9. A conical valve 12, upon a valve stem 13, is movable in the bore 11 and is normally pressed against a seat 14 by a spring 15, which is enclosed within a tubular valve stem guide 16, threaded into the part 10. Openings 16ª in the sides of said guide permit the oil to run into the bore 11, around the valve. Below the valve, the valve stem is tubular as indicated by the dotted lines 17 and constitutes a feed tube for delivering the oil into the steam chest. The part 13ª of the stem which extends from the valve to a point between the boss 9 and the diaphragm is of larger diameter than the lower part 13ᵇ of the stem, which extends through the central openings in the diaphragm and in the base of the casing. Immediately under the valve, the tubular stem is provided with one or more slots or openings 17ª which permit the oil to run from the bore 11, around the valve into the tubular bore in the valve stem each time the valve is raised from its seat, the openings in the stem being close to the seat as shown in Fig. 3.

It will be evident from the construction thus far described that if the valve be raised by the upward movement of the diaphragm, oil will pass by gravity from the reservoir to the steam chest, the pressures in the reservoir and at the outlet end of the tubular valve stem being equal. The interior of the fitting 2 communicates with the interior of the chamber e' through restricted orifices 18 in the base of said chamber and through openings 19 of larger diameter in the wall of the tubular projection 8. Through the restricted orifices live steam at reduced pressure may enter the chamber e' at all times. The diaphragm 7 has one or more restricted orifices 7ᵇ, which are always open to permit the pressures in the chambers e and e' to equalize more or less gradually, and it has ports 7ᶜ which are normally closed against the end of the part 8, but which open, when the diaphragm is forced upwardly, and allow quick equilization of the pressures in said chambers. The bottom of the chamber e' is provided with an opening 20 of somewhat larger cross sectional area than the combined cross sectional areas of the passageways 18, and a pipe 21 connects this opening with the interior of the cylinder a at one end thereof.

In operation, when live steam is admitted to the steam chest through the pipe d, the pressures in the fitting 2, in which the outlet of the oil feed tube is located, and in the oil reservoir are alike. Prior to the admission of steam to the cylinder, steam from the fitting 2 will flow through the restricted orifices 18 into the chamber e' and through the pipe 21 to the end of the cylinder, and this will create a pressure in the chamber e' lower than the live steam pressure. Steam will also pass from the chamber e' through the restricted orifices 7ᵇ into the chamber e and thus the pressures in the chambers e and e' will be equalized. When steam is admitted through the engine valve to the end of the cylinder to which the pipe 21 is connected, the chamber e' will be instantly subjected to the full steam pressure in the cylinder, and as the pressure in the compartment e is then low, the pressure in the compartment e' will force the diaphragm 7 upwardly and this will cause the valve 12 to lift, thereby allowing oil to enter ports 17ª in the feed tube and this oil will pass down the tube to the steam chest. When the diaphragm lifts from the part 8, the ports 7ᶜ are thereby opened and the steam from the compartment e', passing through these ports as well as through the orifices 7ᵇ, quickly causes the pressure in the chamber e to equal that in the chamber e' and when this occurs, the diaphragm immediately seats against the part 8 and the valve 12 closes, cutting off the flow of oil. When the steam exhausts from the end of the cylinder to which the pipe 21 is connected, the pressure in the chamber e' drops, the pressure in the chamber being relieved through the pipe 21, and the pressure in the chamber e also drops by reason of the escape of steam through the ports 7ᵇ. The leakage of live steam through the ports 18 into the compartment e maintains a certain amount of pressure in this compartment as well as in the compartment e' during the exhaust so that the diaphragm is not subjected to the full force of the steam during the working stroke of the piston, but only to the difference between the live steam pressure and that which existed in the compartments of the casing at the end of the exhaust stroke.

It will be evident that each time steam is admitted to the engine cylinder, the valve controlling the outlet of oil from the reservoir will be lifted, allowing a small portion of oil to pass out, to oil the engine valves and cylinder. If the locomotive is drifting with steam cut off, the back pressure in the engine cylinder will cause the diaphragm to lift and open the oil valve, and since there is no steam pressure at this time in the steam chest, nor in the oil reservoir, the oil will flow by gravity through the feed tube at each operation of the oil controlling valve.

While the invention is shown connected to the cylinder of a steam locomotive, it will be evident that the device can be used for oiling the external as well as internal parts of various machines, in which there is developed a fluctuating fluid pressure for actuating the diaphragm which operates the valve controlling the flow of oil. The diaphragm constitutes a movable wall between the chambers e and e' and this wall, or the movable part of it, may be variously constructed.

What I claim is:

1. In an oiling device, a reservoir having an outlet, a normally closed valve controlling said outlet, a casing, a wall dividing said casing into two compartments, said compartments being connected by a restricted orifice and by a normally closed port, and said wall being movable in response to relative changes in pressure in said compartments to open said valve and port, and means for causing fluctuations in pressure in one of said compartments.

2. In an oiling device, an oil reservoir having an outlet, a normally closed valve controlling said outlet, means for maintaining equal fluid pressures in the reservoir and at the outlet, a casing, a movable wall in the casing adapted to actuate said valve, said wall dividing the casing into two compartments and said compartments being connected by a restricted passageway, and means for admitting fluid under fluctuating pressures to one of said compartments.

3. In an oiling device, an oil reservoir having an outlet, a normally closed valve controlling said outlet, means for maintaining equal fluid pressures in the reservoir and at the outlet, a casing, a movable wall in the casing adapted to actuate said valve, said wall dividing the casing into two compartments and said compartments being connected by a restricted passageway, means for maintaining relatively low pressures in said compartments, and means for admitting fluid under relatively high pressure to one of said compartments intermittently.

4. In an oiling device, an oil reservoir, a casing below said reservoir, an outlet chamber, a duct leading from said reservoir to said chamber, a valve normally closing said duct, a movable wall in said casing adapted to actuate said valve, said wall dividing the casing into two compartments, said compartments being connected by a restricted passageway and one of said compartments being connected to said outlet chamber by a restricted passageway, means for admitting fluid under constant pressure to said reservoir and outlet chamber, and means for admitting fluid under fluctuating pressures to said last mentioned compartment.

5. In an oiling device, an oil reservoir, a casing below said reservoir, a diaphragm dividing said casing into two compartments, said compartments being connected by a restricted passageway, a feed tube extending from said reservoir through said casing and diaphragm and having a shoulder adjacent the diaphragm, a normally closed valve controlling the flow of oil through said feed tube, connections for maintaining constant fluid pressure in the reservoir and at the outlet of the feed tube, and connections for admitting fluid under variable pressures to one of said compartments to cause the diaphragm to lift the feed tube and valve.

6. In an oiling device, an oil reservoir, a casing below said reservoir, a diaphragm dividing said casing into two compartments, said compartments being connected by a restricted passageway, a feed tube extending from said reservoir through said casing and diaphragm and having a shoulder adjacent the diaphragm, a normally closed valve controlling the flow of oil through said feed tube, connections for maintaining a relatively high constant fluid pressure in the reservoir and at the outlet of the feed tube, and a relatively lower pressure in one of said compartments, and means for admitting fluid under variable pressures to said latter compartment.

7. In an oiling device, an oil reservoir, a casing below said reservoir, a diaphragm dividing said casing into two compartments, said diaphragm having a normally closed port and said compartments being connected by an open restricted passageway, a feed tube extending from said reservoir through said casing and diaphragm and adapted to be moved by the diaphragm when the latter is moved from normal position, a normally closed valve controlling the flow of oil through the feed tube and movable thereby, connections for maintaining constant fluid pressure in the reservoir and at the outlet of the feed tube, and connections for admitting fluid under variable pressures to one of said compartments to cause the diaphragm to lift the feed tube and valve and open said port.

In testimony whereof I affix my signature in presence of two witnesses.

ROY H. STULL.

Witnesses:
JOHN W. BASSLER.
C. W. CLEMENT.